(12) United States Patent
Kao (10) Patent No.: US 12,372,731 B2
(45) Date of Patent: Jul. 29, 2025

(54) CONNECTOR ASSEMBLY

(71) Applicant: Molex, LLC, Lisle, IL (US)

(72) Inventor: Ming-Huei Kao, New Taipei (TW)

(73) Assignee: Molex, LLC, Lisle, IL (US)

( * ) Notice: Subject to any disclaimer, the term of this patent is extended or adjusted under 35 U.S.C. 154(b) by 143 days.

(21) Appl. No.: 18/102,782

(22) Filed: Jan. 30, 2023

(65) Prior Publication Data

US 2023/0258892 A1   Aug. 17, 2023

(30) Foreign Application Priority Data

Feb. 15, 2022  (CN) .......................... 202210137002.X (51) Int. Cl.
*H04B 10/00* (2013.01)
*G02B 6/42* (2006.01)

(52) U.S. Cl.
CPC .................................. *G02B 6/4277* (2013.01)

(58) Field of Classification Search
CPC ...... G02B 6/4277; G02B 6/4293; G02B 6/43; H01R 13/6581; H01R 13/502; H01R 13/7172
See application file for complete search history.

(56) References Cited

U.S. PATENT DOCUMENTS

| | | | | |
|---|---|---|---|---|
| 5,876,239 A | * | 3/1999 | Morin .................. | H01R 13/717 439/490 |
| 7,390,212 B1 | * | 6/2008 | Yang .................... | H01R 13/717 439/607.05 |
| 7,529,094 B2 | * | 5/2009 | Miller ................. | H01R 13/7172 165/185 |
| 7,601,021 B1 | * | 10/2009 | Yang .................... | G02B 6/4261 439/487 |
| 7,621,773 B2 | * | 11/2009 | Bright .................. | G02B 6/0008 439/490 |
| 8,342,881 B2 | * | 1/2013 | Lang ...................... | H01R 24/00 439/607.01 |
| 8,823,540 B2 | * | 9/2014 | Scholeno ............. | H04B 10/801 340/815.4 |
| 9,255,703 B2 | * | 2/2016 | Auyeung ............. | G02B 6/0008 |
| 9,281,636 B1 | * | 3/2016 | Schmitt .............. | H01R 13/7172 |

(Continued)

FOREIGN PATENT DOCUMENTS

| | | |
|---|---|---|
| CN | 202167680 U | 3/2012 |
| CN | 103036099 A | 4/2013 |

(Continued)

*Primary Examiner* — Agustin Bello (57) ABSTRACT

Disclosed in the present invention is a connector assembly, including a guide shielding cover; a side cover plate; and a light guide piece. The guide shielding cover has a top wall and a side wall, and the side wall has an opening. The side cover plate is assembled on the side wall and shields the opening, and the side cover plate has a first mounting portion. The light guide piece has a second mounting portion matched with and assembled on the first mounting portion. The connector assembly in the present invention, through the side cover plate assembled on the side wall of the guide shielding cover, not only shields the opening on the side wall to generate an action of electromagnetic interference shield (EMI shielding), but also provides an additional construction for assembling the light guide piece through the side cover plate.

20 Claims, 10 Drawing Sheets

(56) References Cited

U.S. PATENT DOCUMENTS

| | | | | |
|---|---|---|---|---|
| 9,787,034 B2* | 10/2017 | Yang | | G02B 6/0008 |
| 9,933,555 B2* | 4/2018 | Henry | | G02B 6/008 |
| 10,826,251 B2* | 11/2020 | Liu | | H01R 13/7172 |
| 11,032,946 B1* | 6/2021 | Yang | | G02B 6/4284 |
| 11,143,830 B2* | 10/2021 | Luo | | G02B 6/4278 |
| 11,251,573 B2* | 2/2022 | Wu | | H01R 13/518 |
| 11,448,837 B2* | 9/2022 | Duan | | H05K 9/0058 |
| 11,557,863 B2* | 1/2023 | Chen | | G02B 6/4256 |
| 2005/0254772 A1* | 11/2005 | Long | | G02B 6/0008 |
| | | | | 385/146 |
| 2005/0255726 A1* | 11/2005 | Long | | G02B 6/0001 |
| | | | | 439/80 |
| 2007/0253168 A1* | 11/2007 | Miller | | G02B 6/4246 |
| | | | | 361/719 |
| 2009/0098767 A1 | 4/2009 | Long | | |
| 2009/0129113 A1* | 5/2009 | Tai | | G02B 6/0008 |
| | | | | 362/555 |
| 2010/0060476 A1* | 3/2010 | Yajima | | G02B 6/4246 |
| | | | | 340/815.65 |
| 2010/0149831 A1* | 6/2010 | Zheng | | G02B 6/0088 |
| | | | | 362/551 |
| 2010/0182798 A1* | 7/2010 | Chen | | H01R 24/64 |
| | | | | 362/555 |
| 2011/0262074 A1* | 10/2011 | Shirk | | G02B 6/4246 |
| | | | | 385/52 |
| 2011/0294347 A1* | 12/2011 | Lang | | H01R 13/6658 |
| | | | | 439/607.01 |
| 2012/0155108 A1* | 6/2012 | Scholeno | | G02B 6/4298 |
| | | | | 362/580 |
| 2013/0082151 A1* | 4/2013 | Liu | | G02B 6/3644 |
| | | | | 248/68.1 |
| 2013/0164970 A1* | 6/2013 | Regnier | | H01R 13/533 |
| | | | | 165/185 |
| 2014/0030922 A1* | 1/2014 | Schmitt | | H01R 13/6587 |
| | | | | 439/607.2 |
| 2015/0171560 A1* | 6/2015 | Yu | | H01R 13/6593 |
| | | | | 439/607.25 |
| 2015/0207247 A1* | 7/2015 | Regnier | | H01R 9/2408 |
| | | | | 439/78 |
| 2016/0202434 A1* | 7/2016 | Masahiko | | G02B 6/3893 |
| | | | | 385/14 |
| 2016/0308313 A1* | 10/2016 | Yang | | G02B 6/0008 |
| 2017/0214170 A1* | 7/2017 | Su | | G02B 6/4284 |
| 2017/0279236 A1* | 9/2017 | Chen | | H01R 33/7671 |
| 2018/0115119 A1* | 4/2018 | Little | | H01R 4/2404 |
| 2019/0039238 A1* | 2/2019 | Dai | | B25J 15/0047 |
| 2019/0296493 A1* | 9/2019 | Liu | | G02B 6/0001 |
| 2020/0049912 A1* | 2/2020 | Lu | | G02B 6/4269 |
| 2020/0137915 A1* | 4/2020 | Morihata | | G02B 6/0008 |
| 2020/0142142 A1* | 5/2020 | Luo | | G02B 6/4269 |
| 2020/0366035 A1* | 11/2020 | Wu | | H01R 13/518 |
| 2021/0066862 A1* | 3/2021 | Chen | | H01R 12/7076 |
| 2021/0096301 A1* | 4/2021 | Chen | | H01R 13/6594 |
| 2021/0105915 A1* | 4/2021 | Wang | | H05K 7/20418 |
| 2021/0141175 A1* | 5/2021 | Wang | | G02B 6/423 |
| 2022/0003943 A1* | 1/2022 | Duan | | H01R 13/7172 |
| 2022/0102906 A1* | 3/2022 | Huang | | H01R 12/727 |
| 2022/0124946 A1* | 4/2022 | Yang | | G02B 6/0001 |
| 2022/0416477 A1* | 12/2022 | Yen | | H01R 13/7172 |
| 2023/0006380 A1* | 1/2023 | Fu | | H01R 12/716 |
| 2023/0258892 A1* | 8/2023 | Kao | | G02B 6/4277 |
| | | | | 385/92 |
| 2024/0291210 A1* | 8/2024 | Hsu | | H01R 13/6594 |

FOREIGN PATENT DOCUMENTS

| | | |
|---|---|---|
| CN | 103928796 A | 7/2014 |
| CN | 110364871 A | 10/2019 |
| CN | 111342283 A | 6/2020 |
| TW | M545384 U | 7/2017 |
| TW | M568379 U | 10/2018 |
| TW | M608933 U | 3/2021 |

* cited by examiner

CONNECTOR ASSEMBLY

RELATED APPLICATIONS

This application claims priority to Chinese Patent Application Serial No. 202210137002.X, filed Feb. 15, 2022, which is incorporated herein by reference in its entirety.

TECHNICAL FIELD

The present invention relates to a connector, an in particular, to a connector assembly.

BACKGROUND

Disclosed in Chinese Patent Publication No. CN103928796 A (corresponding to US Patent Publication No. US2014/0196943A1) are a shielding cover and shielding elements. The shielding cover includes a plurality of walls including at least two opposite side walls and at least one top wall connecting the side walls together. In addition, the shielding cover includes a plurality of openings, which are arranged on one of the top wall or the side walls. The openings have a first shape, a flexible conductive shielding element has a second shape, and the second shape is similar to the first shape but slightly larger than the first shape, to provide an edge region extending around the perimeter of the openings, and the shielding elements are bonded to the shielding cover around the perimeter of the openings to provide a barrier to electromagnetic interference (EMI) leakage from the shielding cover. However, the disclosed shielding elements thereof are independent components that need to be individually mounted on each opening, and the shielding elements have only a single function of shielding each opening.

Disclosed in Chinese utility model patent Publication No. CN 202167680U is that a stop member of a light guide and a convex piece of an upper floor are clamped. The convex piece is integrally constructed from the upper floor, and the convex piece only serves as a single function for installing the light guide, and an additional opening formed to form a convex piece may also affect the shielding effect.

Disclosed in Chinese Patent Publication No. CN103036099A is that the cover includes a flat plate portion and two vertical portions. The flat plate portion is covered on the top wall of the housing body, and the flat plate portion includes several clamping pieces extending upward for fixing the light guide tube. The clamping pieces have a base on the flat plate portion and two arms extending upward from the base. However, the cover has only a single function of mounting the light guide tube.

SUMMARY

Therefore, an objective of the present invention is to provide a connector assembly that can improve at least one problem in the prior art.

In some embodiments, the connector assembly in the present invention comprises a guide shielding cover; a side cover plate; and a light guide piece. The guide shielding cover has a top wall and a side wall, and the side wall has an opening. The side cover plate is assembled on the side wall and shields the opening, and the side cover plate has a first mounting portion. The light guide piece has a second mounting portion matched with and assembled on the first mounting portion.

In some embodiments, the second mounting portion of the light guide piece is assembled on the first mounting portion of the side cover plate from front to rear.

In some embodiments, the first mounting portion of the side cover plate has a convex piece located above the top wall, and a receiving slot located below the convex piece and extending from front to rear, and the second mounting portion of the light guide piece has a holding block inserted into the receiving slot.

In some embodiments, the receiving slot is jointly defined by the convex piece and the top wall.

In some embodiments, the holding block of the light guide piece has an insertion slot, and the lower edge of the convex piece of the side cover plate is inserted into the insertion slot.

In some embodiments, a fixed protrusion facing upward is formed in the insertion slot of the holding block of the light guide piece, and a fixed recess facing downward is formed on the lower edge of the convex piece of the side cover plate and into which the fixed protrusion is clamped.

In some embodiments, the guide shielding cover further has a rear wall, the light guide piece is located on the top wall and extends backward to the rear wall, two side cover plates are respectively assembled on two side walls, the light guide piece has two second mounting portions respectively located on the left and right sides and assembled on the first mounting portions of the two side cover plates, the rear wall has a third mounting portion and the light guide piece has a fourth mounting portion that is matched with and assembled on the third mounting portion.

In some embodiments, the third mounting portion has an insertion piece, and the fourth mounting portion has an insertion hole corresponding to the insertion piece.

In some embodiments, the light guide piece is located on an outer side of the side wall, the side cover plate on the side wall further has a fifth mounting portion located below the first mounting portion, and the light guide piece further has a sixth mounting portion that is matched with and assembled on the fifth mounting portion.

In some embodiments, the fifth mounting portion has a fastening piece, and the sixth mounting portion has a fastening portion correspondingly buckled to the fastening piece.

In some embodiments, the side wall further has a locking piece formed by the opening configuration.

In some embodiments, the front-end of the guide shielding cover is assembled with a plurality of ground pads, the ground pads have a plurality of elastic finger portions, and a plurality of fastening pieces formed at least in part of the plurality of elastic finger portions, the guide shielding cover further has a plurality of fastening holes formed at least on the side wall and correspondingly assembled with the plurality of fastening pieces of the ground pads, and the side cover plate shields the fastening holes located on the side wall.

In some embodiments, the guide shielding cover further has two insertion spaces arranged vertically, the side wall has two openings arranged vertically and forming the locking piece, the two openings respectively correspond to the two insertion spaces, and the side cover plate is assembled on the side wall to shield the two openings.

In some embodiments, the guide shielding cover is provided with a compartment frame, the side wall has first assembly holes, the side cover plate has second assembly holes corresponding to the first assembly holes, and the compartment frame has an assembly piece buckled to the first assembly holes and the second assembly holes.

The connector assembly in the present invention, through the side cover plate assembled on the side wall of the guide shielding cover, not only shields the opening on the side wall to generate an action of electromagnetic interference shield (EMI shielding), but also provides an additional construction for assembling the light guide piece through the side cover plate.

BRIEF DESCRIPTION OF THE DRAWINGS

Other features and effects of the present invention will be clearly presented in the embodiments with reference to the drawings, where.

DETAILED DESCRIPTION OF THE PREFERRED EMBODIMENTS

Before the present invention is described in detail, it should be noted that in the following description, similar elements are designated by the same reference numerals.

Referring to FIGS. 1 to 4, a first example of the connector assembly 100 in the present invention is suitable for inserting with a pluggable module 200. The pluggable module 200 includes a housing 201; an insertion board 202; and a cable 203. The housing 201 includes an insertion portion 201a. The insertion board 202 is disposed at the end of the insertion portion 201a, and the insertion board 202 has a plurality of contact finger portions 202a. The cable 203 is provided in the housing 201 and is mechanically and electrically connected to the insertion board 202. The connector assembly 100 includes a guide shielding cover 1; a receptacle connector 2; a heat dissipation module 3; two side cover plates 4; a light guide piece 5; and a base 6.

The guide shielding cover 1 is constructed by, for example, performing processing methods such as stamping and bending on a conductive metal plate, and configured to guide the pluggable module 200 and produce an effect of shielding electromagnetic interference. The guide shielding cover 1 includes a cover 11; a compartment frame 12 disposed in the cover 11; and two insertion spaces 13 jointly defined by the cover 11 and the compartment frame 12, and separated by the compartment frame 12 and arranged vertically. The cover 11 extends along a front-rear direction D1 (the direction indicated by the arrow is front, the reverse direction is rear), and has a top wall 111, two side walls 112 which are opposite to each other along a left and right direction D2 (the direction indicated by the arrow is right, and the reverse direction is left) and are connected to both sides of the top wall 111, a bottom wall 113 opposite to the top wall 111 along an up-down direction D3 (the direction indicated by the arrow is up, the reverse direction is down) and connected to bottom edges of the two side walls 112, a rear wall 114 connected to the top wall 111 and the rear ends of the two side walls 112, and a plurality of ground pins 115 extending downward from the bottom edge of the two side walls 112 and the bottom edge of the rear wall 114 and configured to be inserted into a circuit board (not shown in the figure), and each ground pin 115 is configured in a pinhole shape to be tightly inserted into a conductive hole on the circuit board.

Each of the side walls 112 of the cover 11 of the guide shielding cover 1 has a plurality of first assembly holes 112a, and the compartment frame 12 has a plurality of assembly pieces 121 buckled to the first assembly holes 112a. The assembly pieces 121 are bent after outwardly passing through the first assembly holes 112a, so that the compartment frame 12 is assembled on the two side walls 112 of the cover 11 of the guide shielding cover 1. The two insertion spaces 13 are divided vertically by the compartment frame 12. The insertion space 13 located above is jointly defined by the top wall 111, the two side walls 112, and the compartment frame 12, the insertion space 13 located below is jointly defined by the two side walls 112, the bottom wall 113, and the compartment frame 12, and each of the insertion spaces 13 has a front-end socket 131 at the front end for the pluggable module 200 to be inserted into.

The receptacle connector 2 is arranged in the rear section of the guide shielding cover 1, and includes a receptacle housing 21 and a plurality of receptacle terminals 22. The receptacle housing 21 has two insertion slots 211 arranged vertically, facing forward, and respectively disposed in the two insertion spaces 13. The receptacle terminals 22 are disposed on the receptacle housing 21. Each of the receptacle terminals 22 has a contact portion 221 extending into the corresponding insertion slot 211, and a tail portion 222 extending downward from the receptacle housing 21, and the tail portion 222 is configured to pass through a bottom opening (not shown in the figure) of the cover 11 of the guide shielding cover 1 to be inserted on the circuit board.

After the pluggable module 200 enters the corresponding insertion space 13 of the guide shielding cover 1 from any of the front-end sockets 131, an insertion board 202 at the end of the insertion portion 201a of the pluggable module 200 can be inserted into the corresponding insertion slot 211 of the receptacle housing 21 of the receptacle connector 2. Therefore, contact finger portions 202a of the insertion board 202 are in contact with the contact portion 221 of the receptacle terminals 22 in the insertion slots 211 of the receptacle housing 21, so that the pluggable module 200 and the receptacle connector 2 of the connector assembly 100 are connected to each other. In addition, a mounting hole (not shown in the figure) of a housing (not shown in the figure) may be arranged at a front section of the guide shielding cover 1 adjacent to the front-end socket 131. The guide shielding cover 1 further includes a plurality of first ground pads 14 arranged at the cover 11 adjacent to the two front-end sockets 131, and a second ground pad 15 disposed adjacent to the two front-end sockets 131 of the compartment frame 12. The first ground pad 14 has a plurality of first elastic finger portions 141 extending backward from the front-end socket 131 and distributed on the outer side and an inner side, and a plurality of fastening pieces 142. Those located on an outer side of the first elastic finger portions 141 are used for contacting with a part of the housing located at a periphery of the mounting hole, those located on an inner side of the first elastic finger portions 141 are used for contacting with the housing 201 of the pluggable module 200, and the fastening pieces 142 are formed at the ends of those located on the inner side of the first elastic finger portions 141. The guide shielding cover 1 further has a plurality of fastening holes 116 formed on the top wall 111; the two side walls 112; and the bottom wall 113 and correspondingly assembled with the plurality of fastening pieces 142 of the first ground pad 14. The second ground pad 15 has a plurality of second elastic finger portions 151 extending backward and distributed on an upper side and a lower side of the compartment frame 12, and the second elastic finger portions 151 are configured to contact with the housing 201 of the pluggable module 200.

In addition, each of the side walls 112 of the cover 11 of the guide shielding cover 1 has two openings 112b arranged vertically and respectively corresponding to the two insertion spaces 13, and two locking pieces 112c formed by the two openings 112b and extending obliquely inward and backward from the front side edges of the two openings 112b. The locking pieces 112c are configured to lock into the locking recess 201b at the side of the insertion portion 201a of the pluggable module 200, to produce a locking effect on the pluggable module 200 inserted into the insertion space 13.

The top wall 111 of the cover 11 of the guide shielding cover 1 has a top opening 111a communicating with the above insertion space 13. The heat dissipation module 3 includes a heat sink 31, and an elastic buckle 32 disposed on the two side walls 112 of the guide shielding cover 1 and assembling the heat sink 31 on the top wall 111 of the guide shielding cover 1. The heat sink 31 has a heat dissipation substrate 311 disposed on the top wall 111 from above; a plurality of heat dissipation fins 312 that are fastened side by side to each other and disposed on the top surface of the heat dissipation substrate 311 for example, by welding; and two accommodating grooves 313 formed between the bottoms of the heat dissipation fins 312 and the heat dissipation substrate 311 and side by side along the front-rear direction D1. The heat dissipation substrate 311 has a heat dissipation coupling portion (not shown in the figure) formed at the bottom that extends downward into the above insertion space 13 through the top opening 111a. The elastic buckle 32 has two pressing portions 321 respectively accommodated in the two accommodating grooves 313 and configured to downward and elastically press against the heat dissipation substrate 311 of the heat sink 31, and two buckling portions 322 respectively connected to the left and right ends of the two pressing portions 321 and buckled to the two side walls 112 of the guide shielding cover 1. Each of the side walls 112 is formed with a buckling protrusion 112d, and each of the buckling portions 322 is formed with a buckling hole 322a buckled to the buckling protrusion 112d. Through the downward pressing force provided by the two elastic buckles 32, it is ensured that when the pluggable module 200 is inserted into the upper insertion space 13, the heat dissipation coupling portion of the heat sink 31 can keep in contact with the top surface of the housing 201 of the pluggable module 200 as completely as possible, to ensure the heat dissipation performance.

Figure 1:
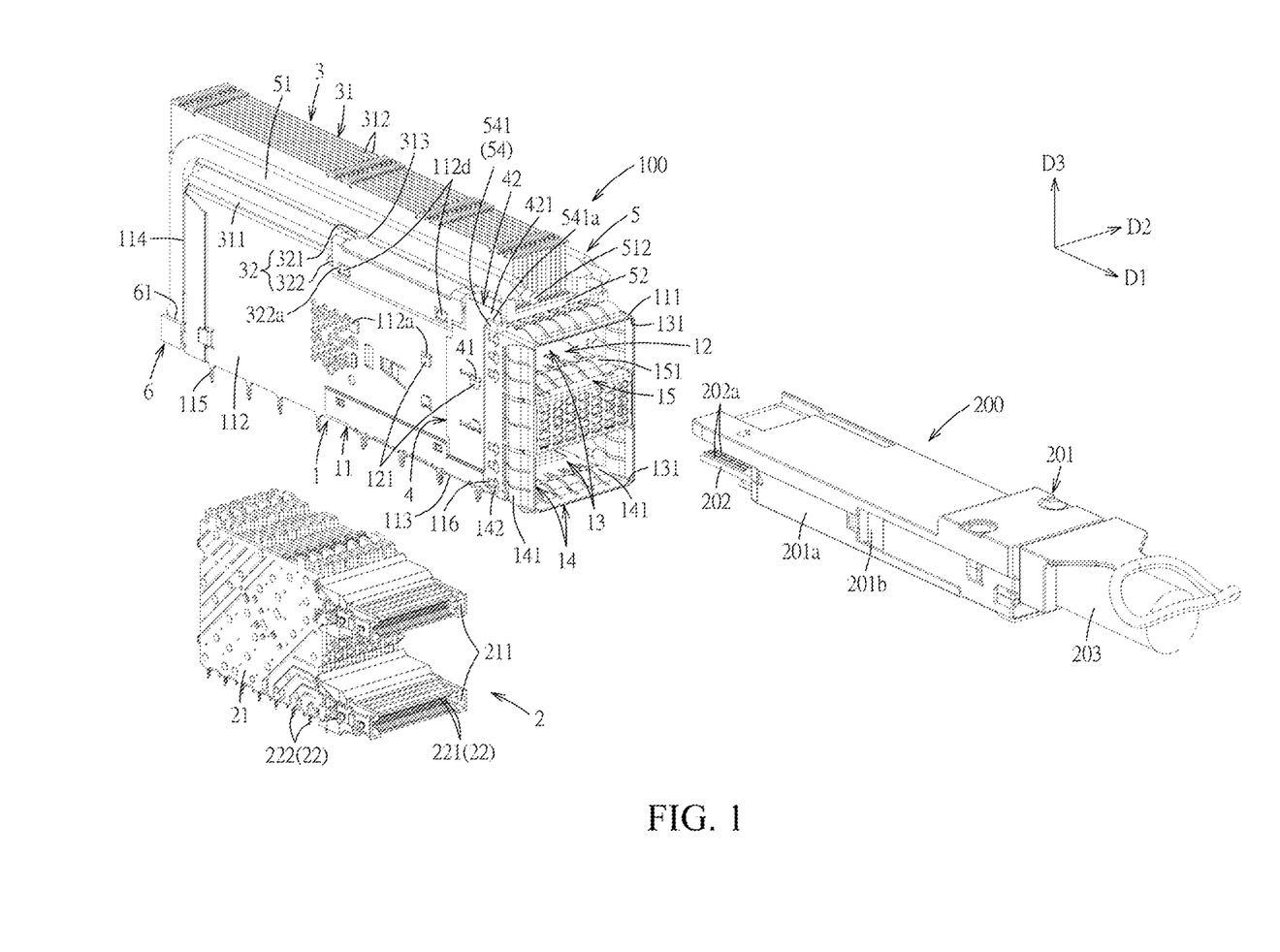
FIG. 1 is a three-dimensional exploded view of a first example of a connector assembly and a pluggable module of the present invention.
Figure 2:
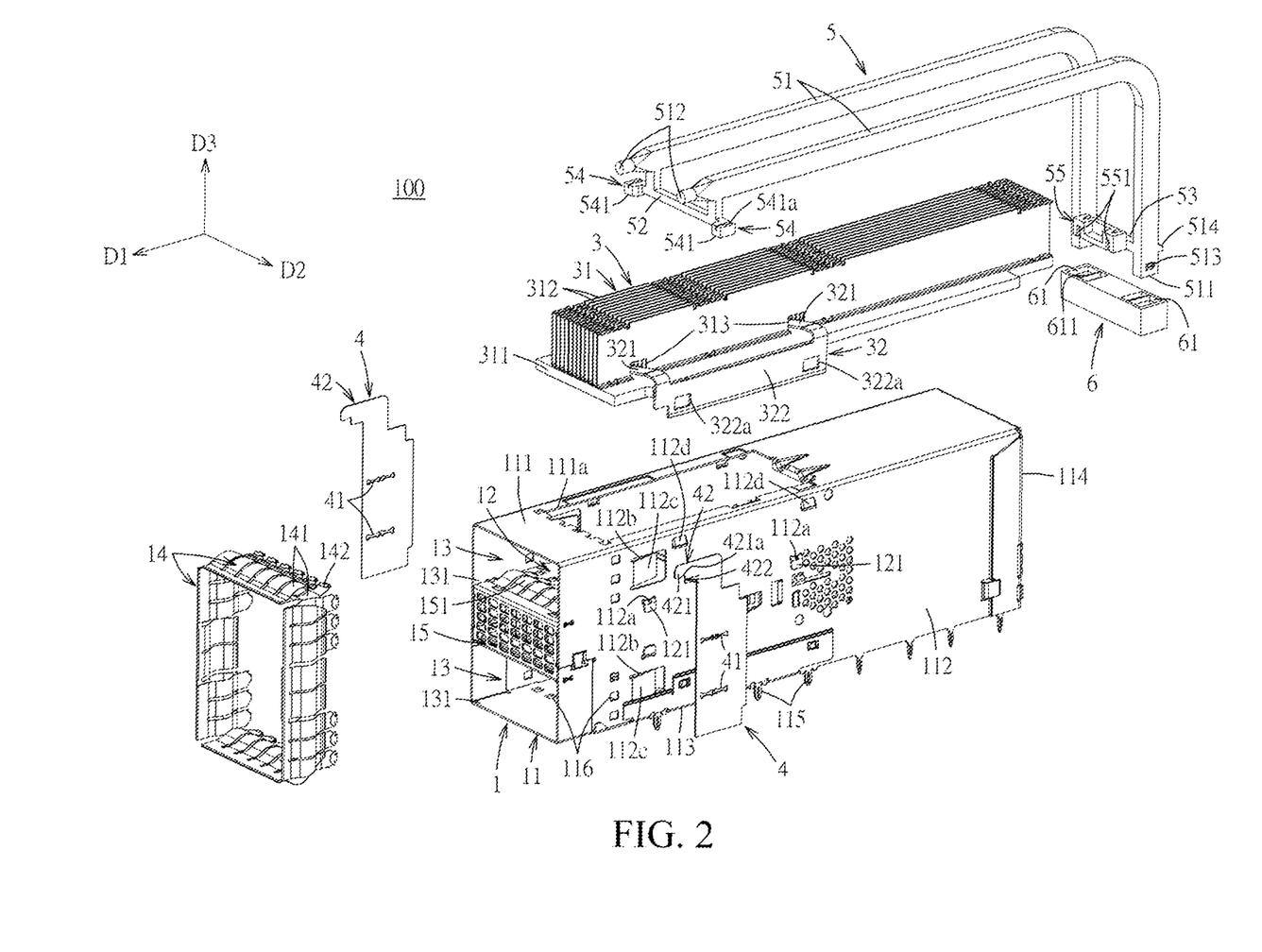
FIG. 2 is a three-dimensional exploded view of the first example.
Figure 3:
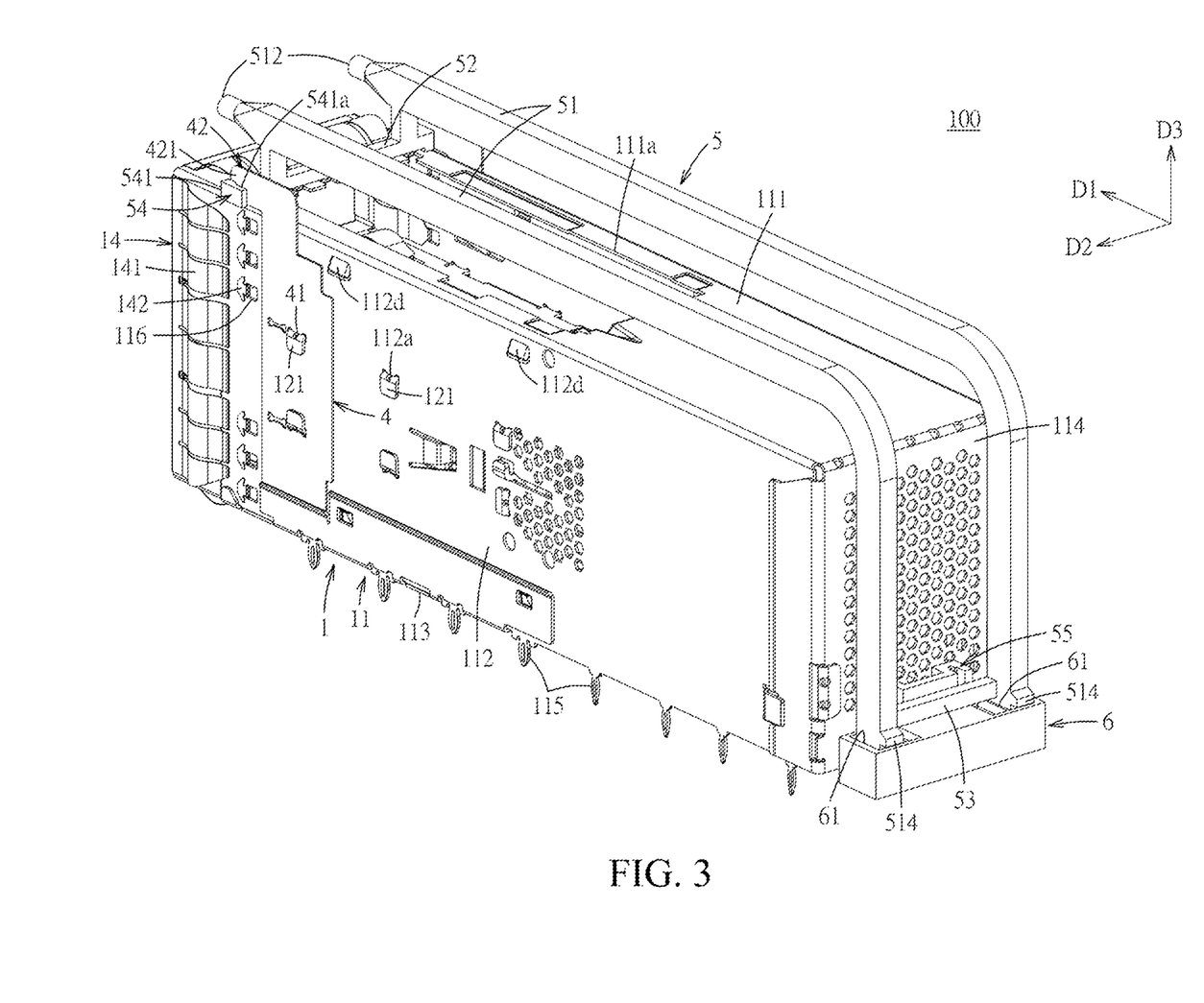
FIG. 3 is a three-dimensional view of the first example, and a heat dissipation module of the first example is omitted in the figure.
Figure 4:
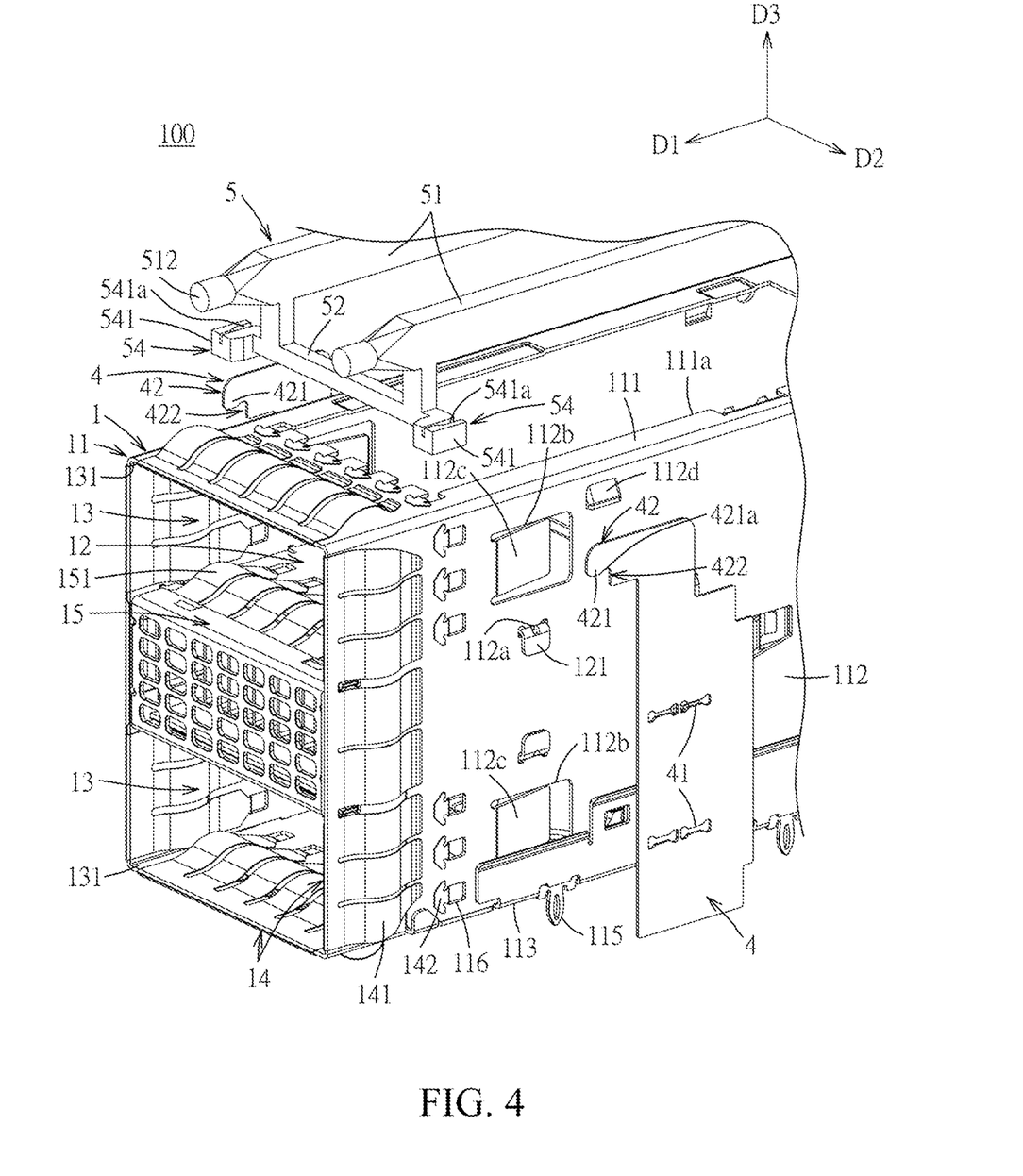
FIG. 4 is a partially enlarged three-dimensional exploded view of the first example.

Referring to FIG. 2 and FIGS. 4 to 7, the two side cover plates 4 are respectively assembled on the two side walls 112 and respectively shield each opening 112b on the side walls 112. The side cover plate 4 has second assembly holes 41, and a first mounting portion 42. The second assembly holes 41 correspond to at least a part of the first assembly holes 112a of the side wall 112 (the first assembly hole 112a at the front section of the side wall 112). At least part of the plurality of assembly pieces 121 of the compartment frame 12 is simultaneously buckled to the first assembly holes 112a and the second assembly holes 41. The at least part of the assembly pieces 121 are bent after sequentially passing through the first assembly holes 112a and the second assembly holes 41, so that the two side cover plates 4 are respectively assembled on the two side walls 112. The rear wall 114 has a third mounting portion 114a. As shown in FIGS. 1 to 3, in the first example, the positions of the assembly pieces 121 in front of the left- and right-side walls 112 in the front-rear direction D1 are different, so the side cover plate 4 is provided with two second assembly holes 41 side by side in the front-rear direction D1. For example, the assembly piece 121 on the right side is at the back and the assembly piece 121 on the left side is at the front, the right-side cover plate 4 uses the rear second assembly holes 41 to buckle the right assembly piece 121 (as shown in FIG. 3), and the left-side cover plate 4 uses the front second assembly holes 41 to buckle the left assembly piece 121 (as shown in FIG. 1). In other variant examples, the positions of the assembly pieces 121 at the front section of the left- and right-side walls 112 in the front-rear direction D1 may be the same. In such a variant example, the side cover plate 4 only needs one second assembly hole 41 in the front-rear direction D1.

The light guide piece 5 has two light guide tubes 51 located on the top wall 111 side by side and extending backward to the rear wall 114; a front connecting post 52 and a rear connecting post 53 of the two light guide tubes 51; two second mounting portions 54 respectively matched and assembled on the first mounting portion 42 of the two side cover plates 4; and a fourth mounting portion 55 matched and assembled on the third mounting portion 114a of the rear wall 114. Each light guide tube 51 has a light entrance end 511 facing downward and configured to face a light emitting element (not shown in the figure) on the circuit board, and a light exit end 512 facing forward. The front connecting post 52 is connected to the two light guide tubes 51 near a light exit end 512, and the rear connecting post 53 is connected to the two light guide tubes 51 near a light entrance end 511. The two second mounting portions 54 are respectively located on the left and right sides and formed on the front connecting post 52, and the fourth mounting portion 55 is formed on the rear connecting post 53. However, it is to be noted that the two second mounting portions 54 and the fourth mounting portion 55 are integrated with the two light guide tubes 51.

Figure 5:
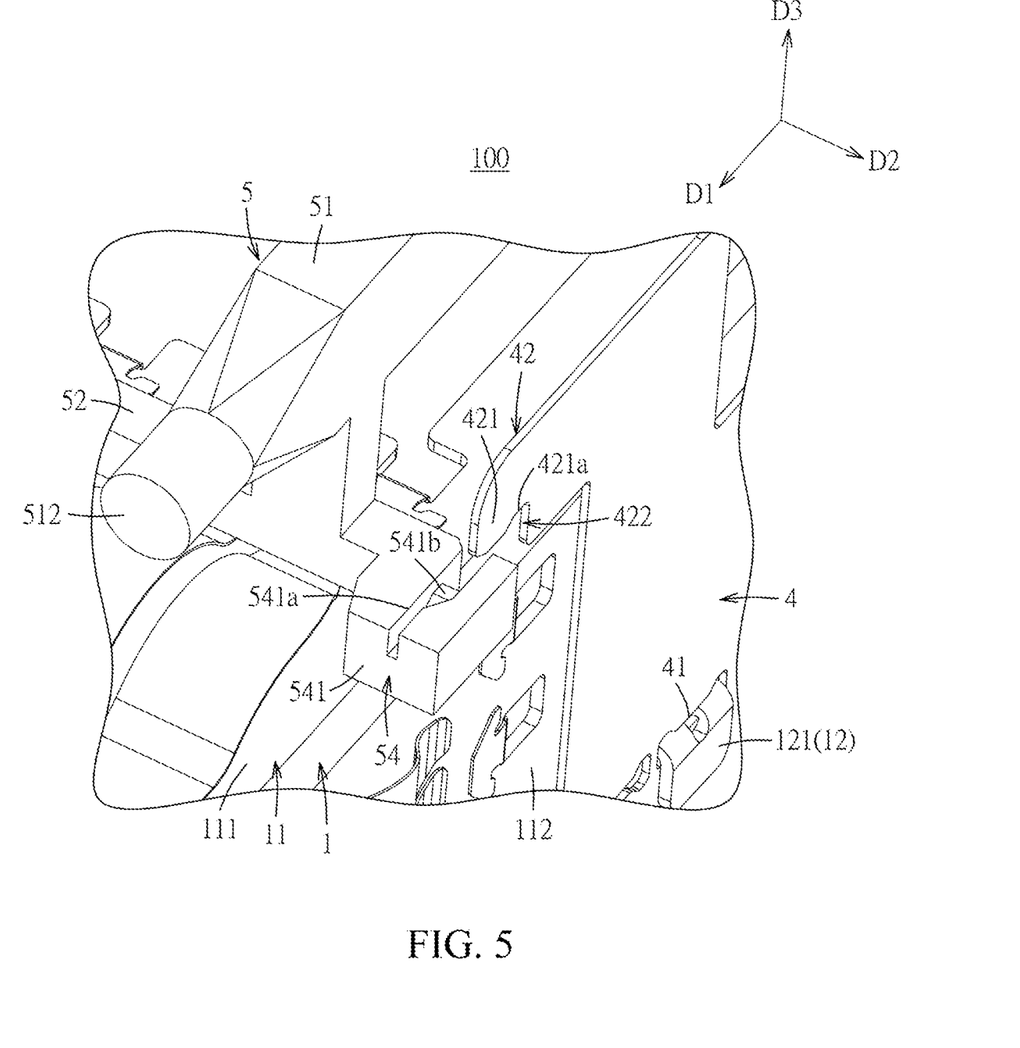
FIG. 5 is another partially enlarged three-dimensional exploded view of the first example, illustrating a first mounting portion of a side cover plate of the first example and a second mounting portion of a light guide piece.
Figure 6:
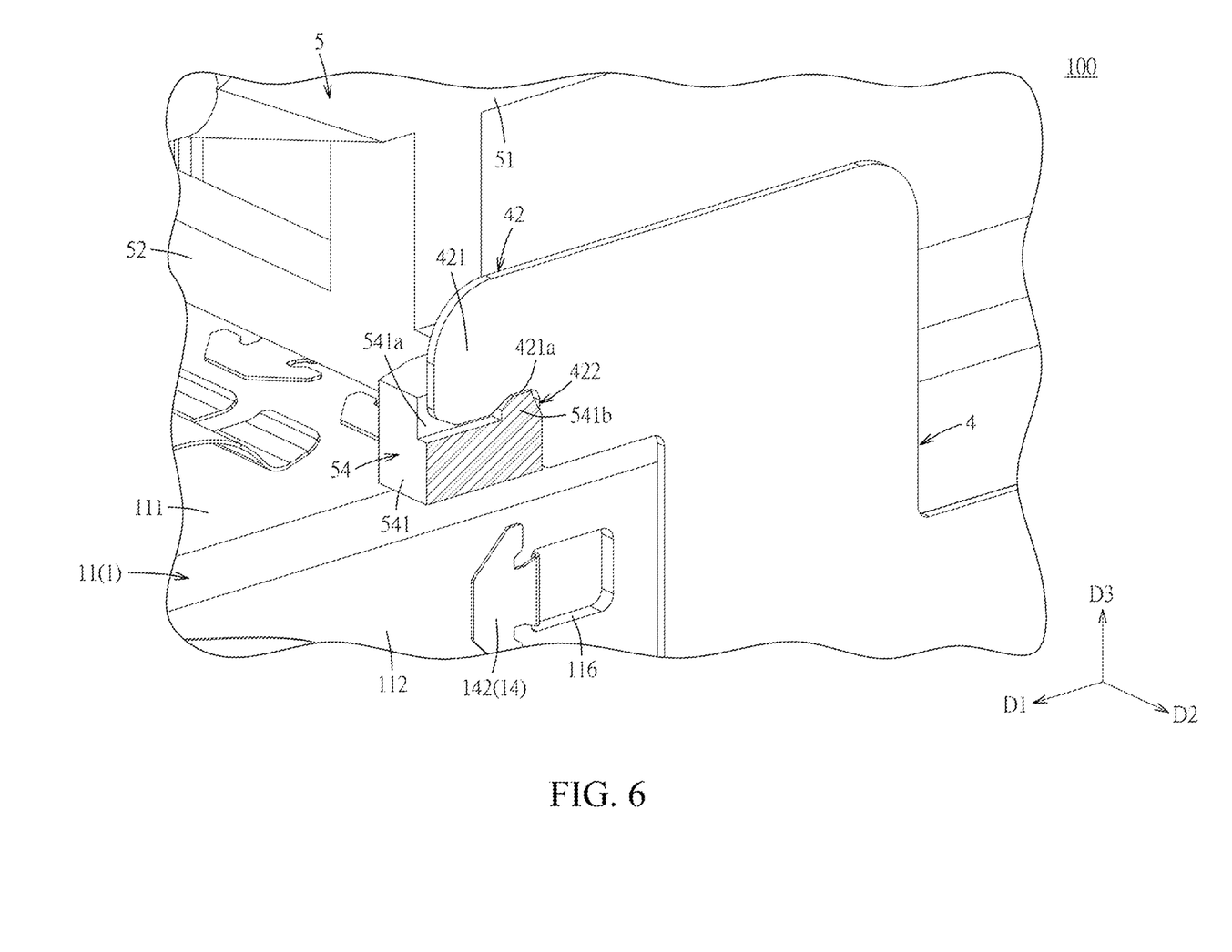
FIG. 6 is a partially enlarged three-dimensional view of the first example, and a holding block portion of the second mounting portion of the light guide piece in the first example is sectioned.
Figure 7:
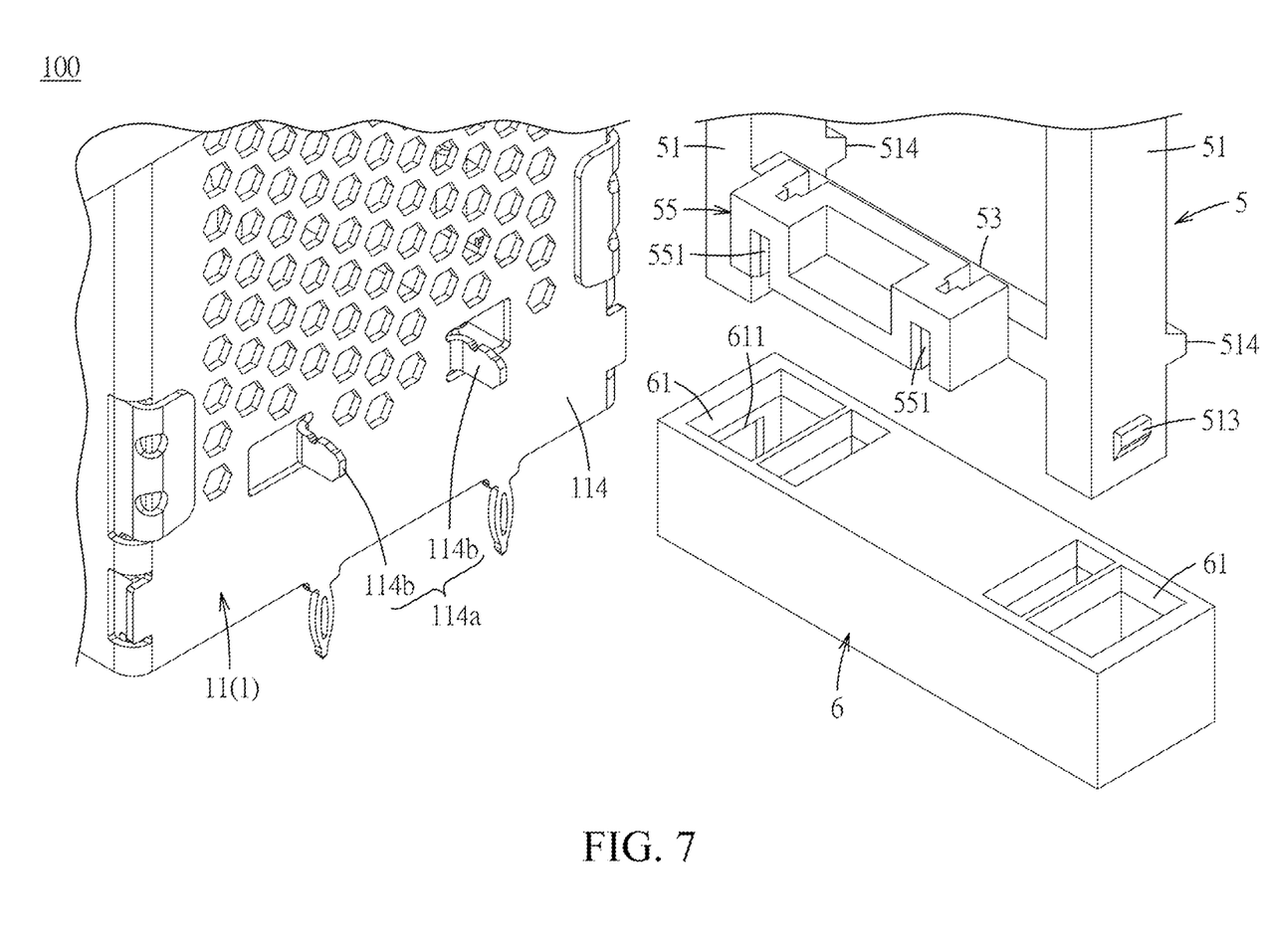
FIG. 7 is another partially enlarged three-dimensional exploded view of the first example, illustrating a third mounting portion of a rear wall of a guide shielding cover of the first example and a fourth mounting portion of a light guide piece.

Specifically, the two second mounting portions 54 of the light guide piece 5 are assembled on the first mounting portion 42 at the top of the two side cover plates 4 from front to rear. The first mounting portion 42 of each of the side cover plates 4 has a convex piece 421 located above the top wall 111, a receiving slot 422 located below the convex piece 421 and extending from front to rear and jointly defined by the convex piece 421 and the top wall 111. Each of the second mounting portions 54 of the light guide piece 5 has a holding block 541 that is inserted backward into the corresponding receiving slot 422 of the first mounting portion 42. The holding block 541 of the light guide piece 5 has an insertion slot 541a, and the lower edge of the convex piece 421 of each side cover plate 4 is inserted into the corresponding insertion slot 541a. In addition, a fixed protrusion 541b facing upward is formed in the insertion slot 541a of the holding block 541 of the light guide piece 5, and a fixed recess 421a facing downward is formed on the lower edge of the convex piece 421 of the side cover plate 4 and into which the fixed protrusion 541b is clamped. In this way, the two second mounting portions 54 of the light guide piece 5 can be prevented from coming out from rear to front from the first mounting portions 42 of the two side cover plates 4, to strengthen the assembly strength between the first mounting portion 42 and the second mounting portion 54. The third mounting portion 114a of the rear wall 114 has two insertion pieces 114b extending backwards side by side, and the fourth mounting portion 55 of the light guide piece 5 has two insertion holes 551 corresponding to the two insertion pieces 114b. The insertion hole 551 is open forward and downward for the insertion piece 114b to enter from the front or below. The light guide piece 5 can be stably held by the cooperation between the first mounting portion 42 and the second mounting portion 54 and by the cooperation between the third mounting portion 114a and the fourth mounting portion 55. In addition, through the side cover plate 4 assembled on the side wall 112 of the guide shielding cover 1, not only an opening 112b on the side wall 112 is shielded, to produce an effect of electromagnetic interference shielding (EMI shielding), further, a structure for assembling the light guide piece 5 is additionally provided by the side cover plate 4.

The base 6 is disposed between the light guide piece 5 and the light emitting element of the circuit board. The base 6 has two accommodating holes 61 corresponding to the two light guide tubes 51 of the light guide piece 5. Each accommodating hole 61 respectively accommodates a light entrance end 511 of the corresponding light guide tube 51 of the light guide piece 5 and a corresponding light emitting element, to ensure that the light emitted by these light emitting elements can respectively enter the light entrance end 511 of the corresponding light guide tube 51 of the light guide piece 5. In addition, a buckle recess 611 is formed in each accommodating hole 61, a buckle block 513 correspondingly buckled to the buckle recess 611 and a stop block 514 for abutting against the top surface of the base 6 are formed in each light guide tube 51, so that the base 6 is stably arranged on the light guide piece 5.

Figure 8:
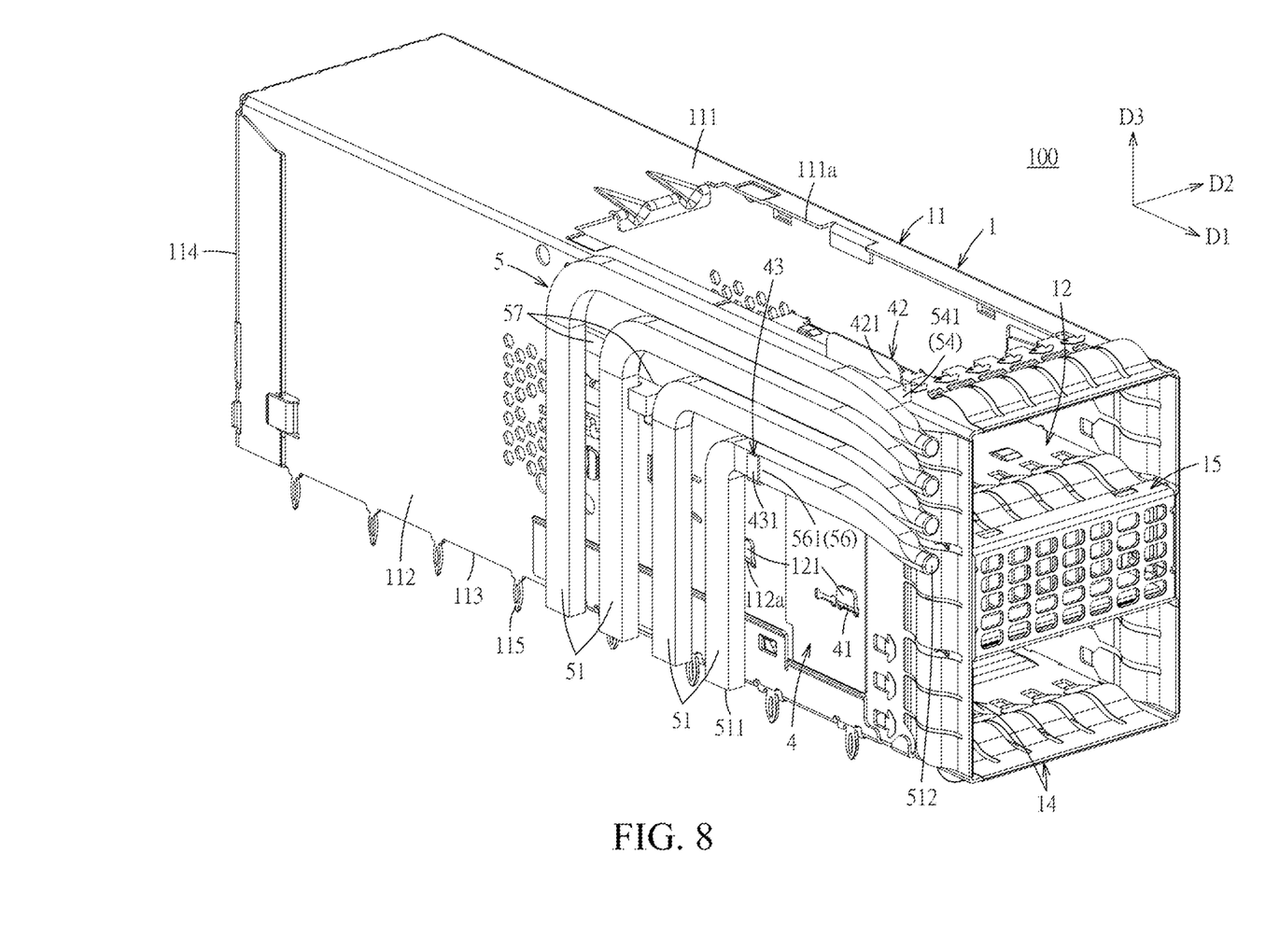
FIG. 8 is a three-dimensional view of a second example of a connector assembly of the present invention.
Figure 9:
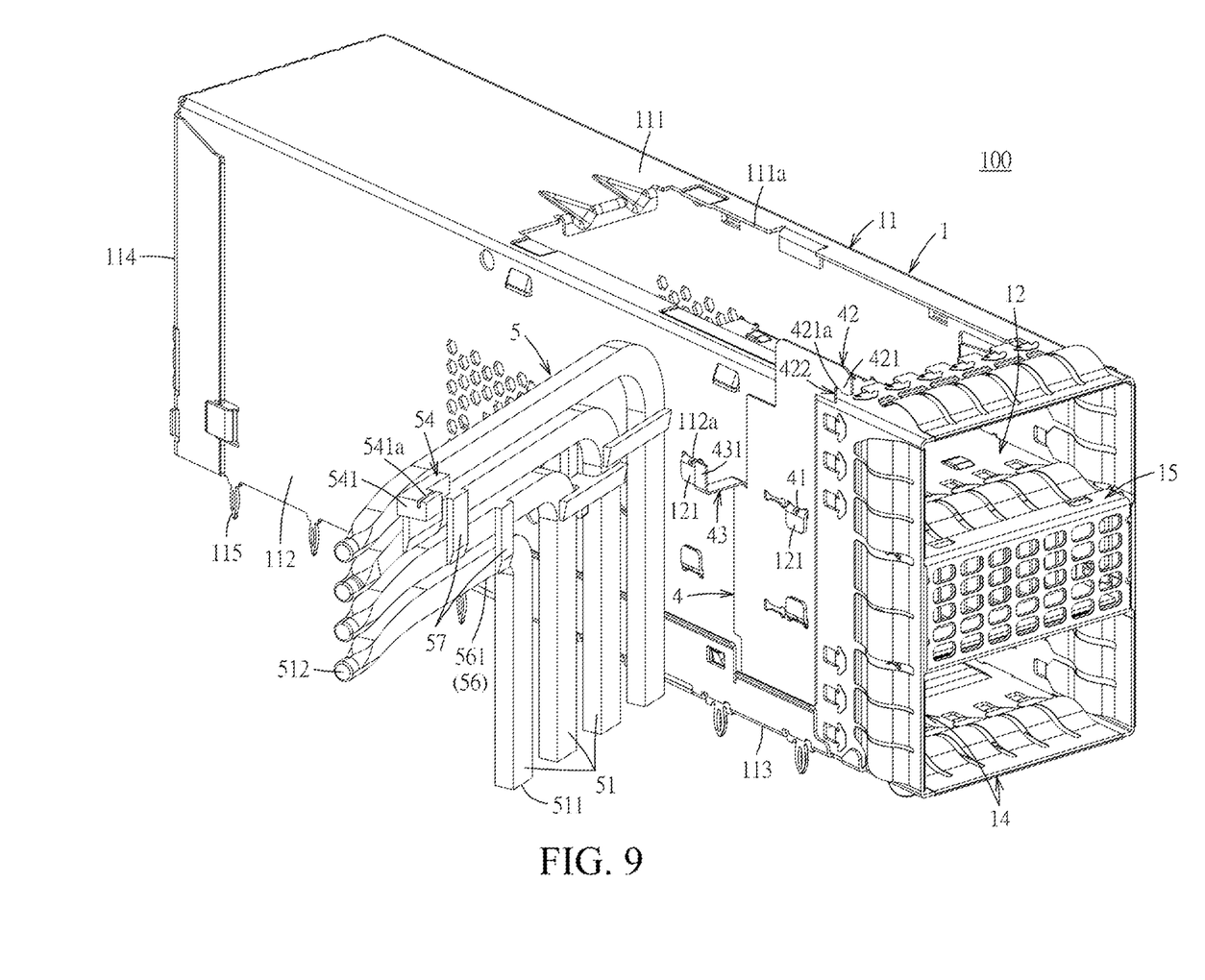
FIG. 9 is a three-dimensional exploded view of the second example.

Referring to FIG. 8 and FIG. 9, a difference between a second example of the connector assembly 100 of the present invention and the first example is that the light guide piece 5 is located outside of one side wall 112 thereof. The side cover plate 4 on the side wall 112 further has a fifth mounting portion 43 located below the first mounting portion 42, and the light guide piece 5 further has a sixth mounting portion 56 that is matched with and assembled on the fifth mounting portion 43. The fifth mounting portion 43 has a fastening piece 431 extending outwardly and bent upwards, and the sixth mounting portion 56 has a fastening portion 561 correspondingly buckled to the fastening piece 431. Specifically, in the second example, the light guide piece 5 has four light guide tubes 51 connected to each other through a plurality of connecting posts 57, and a fourth light guide tube 51 at the bottom is used as a fastening portion 561. However, in other variant embodiments, any one of three of the four light guide tubes 51 may be used as the fastening portion 561, which is not limited by the second example. The light guide piece 5 can be further held more stably by cooperation between the fifth mounting portion 43 and the sixth mounting portion 56.

Figure 10:
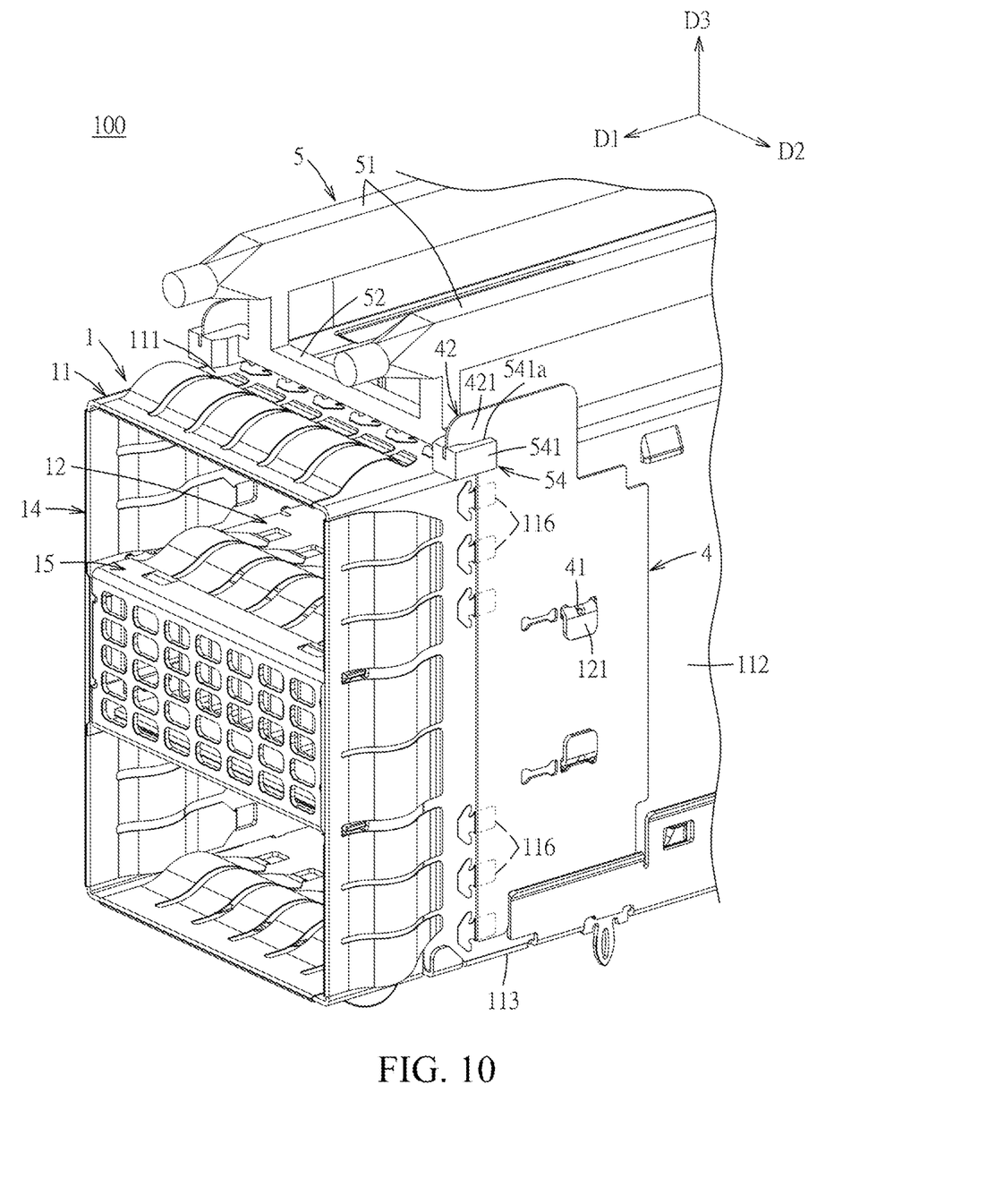
FIG. 10 is a partially enlarged three-dimensional exploded view of a third example of a connector assembly of the present invention.

Referring to FIG. 10, a difference between a third example of the connector assembly 100 of the present invention and the first example is that the two side cover plates 4 further shield the fastening holes 116 located on the two side walls 112 for assembling the first ground pad 14 in a forwardly expanded manner. In this way, the effect of electromagnetic interference shielding can be further enhanced.

In summary, the connector assembly 100 in the present invention, through the side cover plate 4 assembled on the side wall 112 of the guide shielding cover 1, not only shields an opening 112b on the side wall 112 to produce an electromagnetic interference shielding (EMI shielding), but also additionally provides a structure for assembling the light guide piece 5 through the side cover plate 4.

However, the above descriptions are merely examples of the present invention, which should not limit the scope of implementation of the present invention. Any simple equivalent changes and modifications made according to the claims of the present invention shall still fall within the scope of this invention patent.

The invention claimed is:

1. A connector assembly, comprising:
   a guide shielding cover having a top wall and a side wall, the side wall having an opening;
   a side cover plate assembled on the side wall and shielding the opening, the side cover plate having a first mounting portion, the first mounting portion comprising a convex piece located above the top wall; and
   a light guide piece having a second mounting portion matched with and assembled on the first mounting portion, a holding block of the second mounting portion having an insertion slot, wherein the convex piece of the side cover plate is inserted into the insertion slot.

2. The connector assembly according to claim 1, wherein the second mounting portion of the light guide piece is assembled on the first mounting portion of the side cover plate from front to rear.

3. A connector assembly, comprising:
   a guide shielding cover having a top wall and a side wall, the side wall having an opening;
   a side cover plate assembled on the side wall and shielding the opening, the side cover plate having a first mounting portion; and
   a light guide piece having a second mounting portion matched with and assembled on the first mounting portion, wherein
      the second mounting portion of the light guide piece is assembled on the first mounting portion of the side cover plate from front to rear, and
      the first mounting portion of the side cover plate has a convex piece located above the top wall, and a receiving slot located below the convex piece and extending from front to rear, and the second mounting portion of the light guide piece has a holding block inserted into the receiving slot.

4. The connector assembly according to claim 3, wherein the receiving slot is jointly defined by the convex piece and the top wall.

5. The connector assembly according to claim 4, wherein the holding block of the light guide piece has an insertion slot, and the lower edge of the convex piece of the side cover plate is inserted into the insertion slot.

6. The connector assembly according to claim 5, wherein a fixed protrusion facing upward is formed in the insertion slot of the holding block of the light guide piece, and a fixed recess facing downward is formed on the lower edge of the convex piece of the side cover plate and into which the fixed protrusion is clamped.

7. The connector assembly according to claim 1, wherein the guide shielding cover further has a rear wall, the light guide piece is located over the top wall and extends backward to the rear wall, the side cover plate comprises two side cover plates respectively assembled on two side walls of the guide shielding cover, the light guide piece has two second mounting portions respectively located on left and right sides of the guide shielding cover and assembled on first mounting portions of the two side cover plates, the rear wall has a third mounting portion and the light guide piece has a fourth mounting portion that is matched with and assembled on the third mounting portion.

8. The connector assembly according to claim 7, wherein the third mounting portion has an insertion piece, and the fourth mounting portion has an insertion hole corresponding to the insertion piece.

9. The connector assembly according to claim 1, wherein the light guide piece is located on an outer side of the side wall, the side cover plate on the side wall further has a fifth mounting portion located below the first mounting portion, and the light guide piece further has a sixth mounting portion that is matched with and assembled on the fifth mounting portion.

10. The connector assembly according to claim 9, wherein the fifth mounting portion has a fastening piece, and the sixth mounting portion has a fastening portion correspondingly buckled to the fastening piece.

11. The connector assembly according to claim 1, wherein the side wall further has a locking piece extending within the opening.

12. The connector assembly according to claim 11, wherein a front-end of the guide shielding cover is assembled with a plurality of ground pads, the ground pads have a plurality of elastic finger portions, and a plurality of fastening pieces formed at least in part of the plurality of elastic finger portions, the guide shielding cover further has a plurality of fastening holes formed at least on the side wall and correspondingly assembled with the plurality of fastening pieces of the ground pads, and the side cover plate shields the fastening holes located on the side wall.

13. The connector assembly according to claim 11, wherein the guide shielding cover further has two insertion spaces arranged vertically, the side wall has two openings arranged vertically, the two openings respectively correspond to the two insertion spaces, and the side cover plate is assembled on the side wall to shield the two openings.

14. The connector assembly according to claim 1, wherein the guide shielding cover is provided with a compartment frame, the side wall has first assembly holes, the side cover plate has second assembly holes corresponding to the first assembly holes, and the compartment frame has an assembly piece buckled to the first assembly holes and the second assembly holes.

15. A connector assembly, comprising:
a guide shielding cover having a top wall and a side wall, the side wall having an opening with a locking piece extending within the opening;
a side cover plate assembled on the side wall, over the locking piece, and shielding the opening, the side cover plate having a first mounting portion comprising a convex piece; and
a light guide piece having a second mounting portion matched with and assembled on the first mounting portion, a holding block of the second mounting portion having an insertion slot, wherein the convex piece of the side cover plate is inserted into the insertion slot.

16. The connector assembly according to claim 15, wherein the light guide piece comprises two light guide tubes, the two light guiding tubes extend over the top wall of the guide shielding cover, and the second mounting portion of the light guide piece extends at least in part to an outer side of the side wall.

17. The connector assembly according to claim 15, wherein the light guide piece comprises two light guide tubes, a front connecting post connected to the two light guide tubes, and a rear connecting post connected to the two light guide tubes.

18. The connector assembly according to claim 17, wherein the guide shielding cover has a rear wall, the rear wall has a third mounting portion, the light guide piece has a fourth mounting portion on the rear connecting post, and the fourth mounting portion is matched with and assembled on the third mounting portion.

19. The connector assembly according to claim 15, wherein the guide shielding cover further has two insertion spaces arranged vertically, the side wall has two openings arranged vertically, the two openings respectively correspond to the two insertion spaces, and the side cover plate is assembled on the side wall to shield the two openings.

20. The connector assembly according to claim 15, wherein the guide shielding cover is provided with a compartment frame, the side wall has first assembly holes, the side cover plate has second assembly holes corresponding to the first assembly holes, and the compartment frame has an assembly piece buckled to the first assembly holes and the second assembly holes.

* * * * *